United States Patent
Zhang et al.

(10) Patent No.: US 10,439,354 B2
(45) Date of Patent: Oct. 8, 2019

(54) CASCADE CONTROL SYSTEM OF OPTICAL FIBER AMPLIFIER

(71) Applicant: Accelink Technologies Co., Ltd., Wuhan (CN)

(72) Inventors: Peng Zhang, Wuhan (CN); Chengpeng Fu, Wuhan (CN); Chunping Yu, Wuhan (CN); Jintao Tao, Wuhan (CN); Cuihong Zhang, Wuhan (CN)

(73) Assignee: Accelink Technologies Co., Ltd. (CN)

( * ) Notice: Subject to any disclaimer, the term of this patent is extended or adjusted under 35 U.S.C. 154(b) by 328 days.

(21) Appl. No.: 15/529,822

(22) PCT Filed: Dec. 26, 2014

(86) PCT No.: PCT/CN2014/095113
§ 371 (c)(1),
(2) Date: May 25, 2017

(87) PCT Pub. No.: WO2016/082271
PCT Pub. Date: Jun. 2, 2016

(65) Prior Publication Data
US 2017/0324210 A1 Nov. 9, 2017

(30) Foreign Application Priority Data
Nov. 25, 2014 (CN) .......................... 2014 1 0685856

(51) Int. Cl.
*H01S 3/091* (2006.01)
*G05B 6/02* (2006.01)
(Continued)

(52) U.S. Cl.
CPC .............. *H01S 3/0912* (2013.01); *G05B 6/02* (2013.01); *G05B 13/026* (2013.01);
(Continued)

(58) Field of Classification Search
CPC .... H01S 3/0912; H01S 3/1301; H01S 3/1305; H01S 3/06754; H01S 3/06779
See application file for complete search history.

(56) References Cited

U.S. PATENT DOCUMENTS 6,031,660 A * 2/2000 Park ...................... H01S 3/1301
359/341.4
2003/0067670 A1* 4/2003 Pavel ................... H01S 3/06758
359/337

(Continued)

OTHER PUBLICATIONS

International Search Report for Application No. PCT/CN2014/095113 dated Aug. 24, 2015.

*Primary Examiner* — Eric L Bolda
(74) *Attorney, Agent, or Firm* — Lerner, David, Littenberg, Krumholz & Mentlik, LLP

(57) ABSTRACT

A cascade control system of an optical fiber amplifier includes a target setting parameter module, a primary controller, at least one controlled module and a secondary controller corresponding to the controlled module. The control system adopts two or more cascade control loops so that disturbance entering into the secondary loop can be overcome quickly, thereby the dynamic characteristics of the system may be improved. The primary controller aims to coarse adjustment and overall target control, and the secondary controller aims to fine adjustment and quick convergence of a short-term target, so that the control quality of the cascade control system may be further improved. The cascade control system may define the overall control target directly in the primary loop and avoid impact of aging characteristics of some special parameters on the application.

8 Claims, 3 Drawing Sheets

(51) Int. Cl.
  *G05B 13/02* (2006.01)
  *H01S 3/067* (2006.01)
  *H01S 3/094* (2006.01)
  *H01S 3/13* (2006.01)
  *H01S 3/16* (2006.01)
  *H01S 3/30* (2006.01)

(52) U.S. Cl.
  CPC .... *H01S 3/06754* (2013.01); *H01S 3/094003* (2013.01); *H01S 3/1301* (2013.01); *H01S 3/1305* (2013.01); *H01S 3/1608* (2013.01); *H01S 3/302* (2013.01)

(56) References Cited

U.S. PATENT DOCUMENTS

| | | | |
|---|---|---|---|
| 2003/0138006 A1* | 7/2003 | Holsinger | H01S 3/1312 372/29.011 |
| 2005/0116147 A1* | 6/2005 | Oota | H01S 3/06754 250/214 AG |
| 2008/0198445 A1 | 8/2008 | Murison et al. | |
| 2008/0284522 A1 | 11/2008 | Denoyer | |
| 2008/0285118 A1 | 11/2008 | Nati et al. | |

* cited by examiner

CASCADE CONTROL SYSTEM OF OPTICAL FIBER AMPLIFIER

CROSS REFERENCE TO RELATED APPLICATIONS

The present application is a national phase entry under 35 U.S.C. § 371 of International Application No. PCT/CN2014/095113, filed Dec. 26, 2014, which claims priority from Chinese Patent Application No. 201410685856.7 filed Nov. 25, 2014, all of which are hereby incorporated herein by reference.

FIELD OF THE INVENTION

The present invention relates to a control system for an optical amplifier in an optical communication system, and more particularly, to a cascade control system for a Raman optical fiber amplifier or an erbium-doped optical fiber amplifier (EDFA). The present invention belongs to the field of optical fiber communication.

BACKGROUND OF THE INVENTION

Currently, distributed Raman optical fiber amplifiers (RFAs) and erbium-doped optical fiber amplifiers (EDFAs) have been widely used in communication systems. To meet a variety of requirements for application indices and functionalities, a number of control processes are used in product designs of the optical fiber amplifiers. For example, feed-forward and feedback are combined to improve transient indices, and a prediction-based method is used to realize a pre-response to fast timing. In the following scenarios, an appropriate controller design is critical to achieve control functionalities and performances that satisfy the requirements:

In a situation where the control target has a plurality of parameters, it is usually difficult to achieve control performance that meets the requirements. In an EDFA amplifier, for example, gain is limited in a power mode, or power is limited in a gain mode. In such cases, a control process using a single loop can hardly overcome impact of disturbance to obtain desirable dynamic characteristics.

To optimize the system indices or to achieve certain functional characteristics in a multi-pumping optical fiber amplifier, various pumping lasers may be required to have its power controlled according to some parameters or control goals. For example, in a gain tunable distributed Raman optical fiber amplifier, power of pumping lasers of different wavelengths is determined according to a predetermined proportion to achieve control on tilt and gain; or in an EDFA amplifier, in order to obtain better optical indices, pumping power is assigned according to a fixed proportion when the input optical power and gain are within a particular range and assigned according to another proportion when the input optical power and gain are in other ranges. For such system requirements, the controller cannot be implemented directly by using a single-loop controller. A compromise is to calibrate the pumping power-current curve in manufacturing of the products, and the single loop controller is used to carry out real-time control with reference to a lookup table that refers power to current. However, such a compromise adds the cost of time and labor to carry out the calibration, and as time flies, the pumping power-current curve may change due to aging of the pumping lasers, which cause the control goals unachievable, and the amplifier cannot converge to a correct operating point.

SUMMARY OF THE INVENTION

An object of the present invention is to overcome the problems and shortcomings in the prior arts by providing a cascade control system to control a pumping laser in an optical fiber amplifier.

To solve the above technical problems, the present invention provides a cascade control system for an optical fiber amplifier, comprising a target setting parameter module, a primary controller, at least one controlled module, and a secondary controller corresponding to the controlled module; wherein the target setting parameter module serves to set a first target parameter signal to the primary controller, the first target parameter being a first output parameter desired for the controlled module to achieve;

the primary controller generates a second target parameter signal corresponding to each controlled module based on the first target parameter signal outputted from the target setting parameter module and a first target parameter monitoring signal outputted from the controlled module, the second target parameter being a second output parameter desired for the controlled module to achieve, the second output parameter desired for the controlled module to achieve is different from but associated to the first output parameter desired for the controlled module to achieve;

the secondary controller outputs a control signal to the corresponding controlled module based on the second target parameter signal and the second target parameter monitoring signal outputted from the controlled module;

the controlled module is driven by the control signal outputted from the secondary controller and operates to generate a corresponding second target parameter monitoring signal that is fed back to the corresponding secondary controller and a corresponding first target parameter monitoring signal that is fed back to the primary controller;

the secondary controller and the corresponding controlled module constitute an inner feedback control loop; and the inner feedback control loop and the primary controller constitute an outer feedback control loop.

In the above technical solution, the controlled module is a pumping laser and amplifier module, the first target parameter is a real-time gain desired for the pump laser and amplifier module to achieve, and the second target parameter is a real-time pumping power desired for the pumping laser and amplifier module to achieve.

In the above technical solution, the outer feedback control loop further comprises a secondary target parameter modification module and a secondary target parameter setting module corresponding to the secondary controller; the secondary target parameter modification module modifies the second target parameter signal outputted from the primary controller based on a value set by the secondary target parameter setting module.

In the above technical solution, the secondary target parameter modification module is an upper-limit power protection module, the secondary target parameter setting module is a limited power setting module, and the upper-limit power protection module modifies the second target parameter signal outputted from the primary controller based on a limit value set by the limited power setting module.

In the above technical solution, the secondary target parameter modification module is a multiplier, the secondary target parameter setting module is a power coefficient setting module, and the multiplier modifies the second target parameter signal outputted from the primary controller based on a coefficient set by the power coefficient setting module.

In the above technical solution, the outer feedback control loop includes a plurality of inner feedback control loops parallel with each other, and each inner feedback control loop corresponds to a set of secondary target parameter modification module and secondary target parameter setting module.

In the above technical solution, the outer feedback control loop includes a plurality of inner feedback control loops cascaded to each other, and each inner feedback control loop corresponds to a set of secondary target parameter modification module and secondary target parameter setting module.

In the above technical solution, the primary controller and the secondary controller may be a feedback controller or a feedforward feedback controller;

the primary controller and the secondary controller may be a PID controller, or a PI controller;

the primary controller and the secondary controller may also incorporate fuzzy logic control, and adaptive control.

The present invention has the following advantages and positive effects:

1) in the situation where the control target has a plurality of parameters, the problem that the single-loop control structure is unable to accommodate disturbance with a relative large variation amplitude can be overcome, resulting in better dynamic characteristics; and the control target is directly mapped when the control structure is implemented, leading to a clear structure and a design in which the design target is visible directly in the design structure; when the control target changes, it is easy to modify and maintain the specific implementation with a low cost;

2) a new method is provided to control power of different pumping lasers based on some parameters or control targets, which avoids the problematic control accuracy due to pump aging and accomplishes real-time dynamic adjustment of the proportion of pumping power to meet the performance requirements;

3) the disturbance entering into an secondary loop can be overcome quickly, a load change can be accommodated very well, and the power of different pumping lasers may be controlled based on some parameters or control targets.

DETAILED DESCRIPTION OF THE PREFERRED EMBODIMENTS

The present invention will now be described in further detail with reference to the accompanying drawings and specific embodiments in order to facilitate understanding and practice of the invention by one of ordinary skill in the art.

The invention will now be further described with reference to the accompanying drawings and two application examples:

In general, the present invention is to solve the problems of two application situations. In a first application situation where a overall control target is associated with two or more parameters, two or more control loops are used and, with such a control configuration, the plurality of parameters may be decoupled with each other, and fluctuation caused by real-time iterative calculation in single-loop control may be avoided, thereby improving the dynamic indicator of the system. In a second application situation where power ratio of a plurality of pumping lasers needs to be controlled, a cascade control structure is used to carry out the power control instead of the conventional method of calibrating the pumping power-current curve, so that the problematic control accuracy due to pump aging may be avoided.

Figure 1:
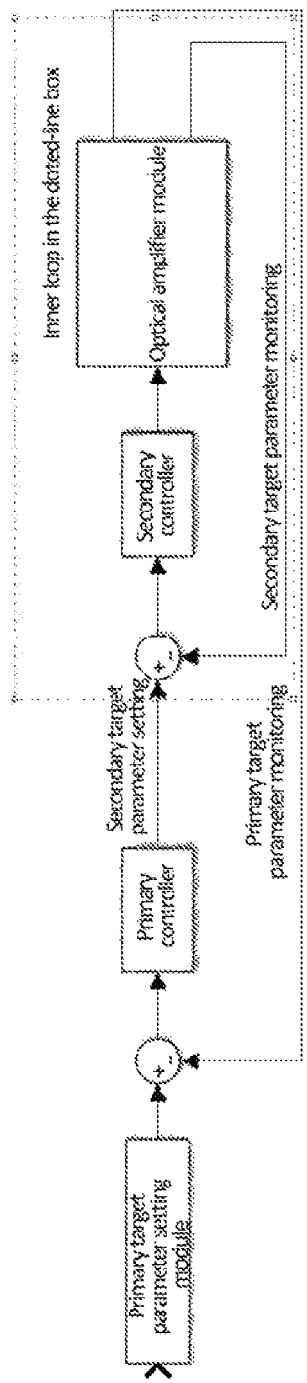
FIG. 1 shows a general structure of a cascade controller for an optical fiber amplifier.

A general control structure of the present invention is shown in FIG. 1, in which a primary target parameter setting module outputs a setting signal and the setting signal is provided to a primary controller, the primary controller outputs a secondary target parameter setting signal and the secondary target parameter setting signal is provided to a secondary controller, the secondary controller outputs a control signal and the control signal is provided to an amplifier module, the amplifier module outputs a secondary target parameter monitoring signal that is fed back to the secondary controller forming an inner feedback control loop, and a primary target parameter monitoring signal that is fed back to the primary controller forming an outer feedback control loop.

In the overall control structure of the technical solution shown in FIG. 1, the entire control loop is composed of the inner feedback control loop and the outer feedback control loop.

As shown in FIG. 1, the inner feedback control loop is a portion within the dotted line box. The inner feedback control loop comprises: a secondary controller, i.e., an inner loop controller, and an amplifier module; the secondary controller receives a secondary target parameter setting signal and a secondary target parameter monitoring signal, the secondary target parameter setting signal is from a control signal output module of the upper-level primary controller, and the secondary target parameter monitoring signal is a real-time value outputted from the amplifier module.

As shown in FIG. 1, the outer feedback control loop comprises: the inner feedback control loop, a primary controller, i.e., an outer loop controller, and a primary target parameter setting module. The primary target parameter setting module serves to set and output a setting signal, i.e., the overall control target. The primary controller receives an input signal including the setting signal outputted from the primary target parameter setting module and the primary target parameter monitoring signal. The primary target parameter monitoring signal is a real-time value outputted from the amplifier module, and the outer loop control signal outputted from the primary controller is the secondary target parameter setting signal for the inner feedback control loop.

There is only one outer feedback control loop in the cascade controller shown in FIG. 1. however, it is expectable for those skilled in the art that one or more inner feedback control loops may be used depending on the actual needs, and the plurality of inner feedback control loops may be arranged in a nested and/or parallel configuration. That is, there may be a plurality of levels of inner feedback control loops which are nested/cascaded to each other, and each level may includes a plurality of inner feedback control loops that are parallel with each other. The last level of inner feedback control loop provides a control signal that directly controls the operating current of the pumping laser.

The primary controller in the outer feedback control loop and the secondary controller in respective inner feedback control loop are either a feedback controller or a feedforward feedback controller, typically a PID controller or a PI controller, or other feedback controllers incorporating fuzzy logic control and adaptive control functions.

The primary controller in the outer feedback control loop and the secondary controller in respective inner feedback control loop are generally implemented by an analog circuit or a digital processor, typically, an analog PID circuit or a digital PID controller using a DSP.

Figure 2:
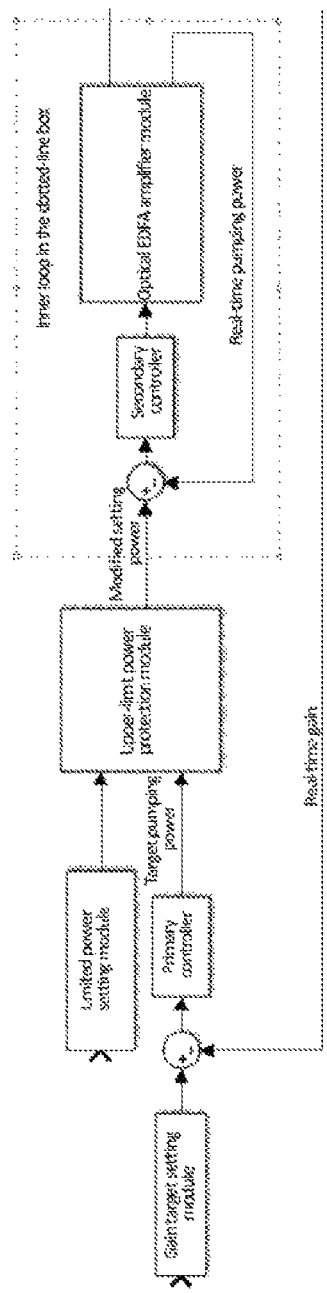
FIG. 2 shows an example of implementation of power limit in an EDFA amplifier in a gain mode.

FIG. 2 shows an implementation of a cascade control structure for an EDFA amplifier in a gain mode where power is limited. Compared with a single-loop controller, it is characterized in that: gain is still the primary control target, which is used in the primary loop, i.e., the outer feedback control loop, and power is the secondary control target, which is used in the secondary loop, i.e., the inner feedback control loop; two control parameters, i.e., fixing the gain and limiting the power, are realized simultaneously, i.e., a maximum output power is achieved while the gain is fixed to a given value.

As shown in FIG. 2, the inner feedback control loop is a portion shown within the dotted line box, which includes a secondary controller, and a pumping laser and amplifier module. The real-time pumping power signal outputted from the pumping laser and amplifier module and the modified power setting signal are provided to the secondary controller, and the secondary controller outputs a control signal that is provided to the pumping laser and amplifier module. The inner feedback control loop realizes the pumping power fixing function for the pumping laser and amplifier module. That is, the secondary controller adjusts the driving operation current of the pumping laser and amplifier module based on difference between the real-time pumping power value outputted from the pumping laser and amplifier module and the modified power setting value, and drives the pumping laser and amplifier module to operate.

As shown in FIG. 2, the outer feedback control loop comprises the inner feedback control loop, a primary controller, and a target gain setting module. The outer feedback control loop further comprises an upper-limit power protection module and a limited power setting module. The real-time gain signal outputted from the pumping laser and amplifier module and the gain setting signal outputted from the target gain setting module are provided to the primary controller, and the target pumping power signal outputted from the primary controller and the power upper-limit setting signal outputted from the limited power setting module are provided to the upper-limit power protection module which modifies the target pumping power signal based on the power upper-limit setting signal and outputs the modified power setting signal. The primary controller adjusts the target pumping power signal based on difference between the real-time gain signal and the gain setting signal so that the gain of the amplifier converges to the given value.

The upper-limit power protection module functions to ensure that the modified power setting value is not greater than the limited power setting value represented by the power upper-limit setting signal, i.e., to realize the so-called PLIMT function. When the target pumping power value outputted from the primary controller is greater than the limited power setting value, the power setting value is modified to be equal to the limited power setting value. Otherwise, the target power setting value is equal to the target pumping power value.

Figure 3:
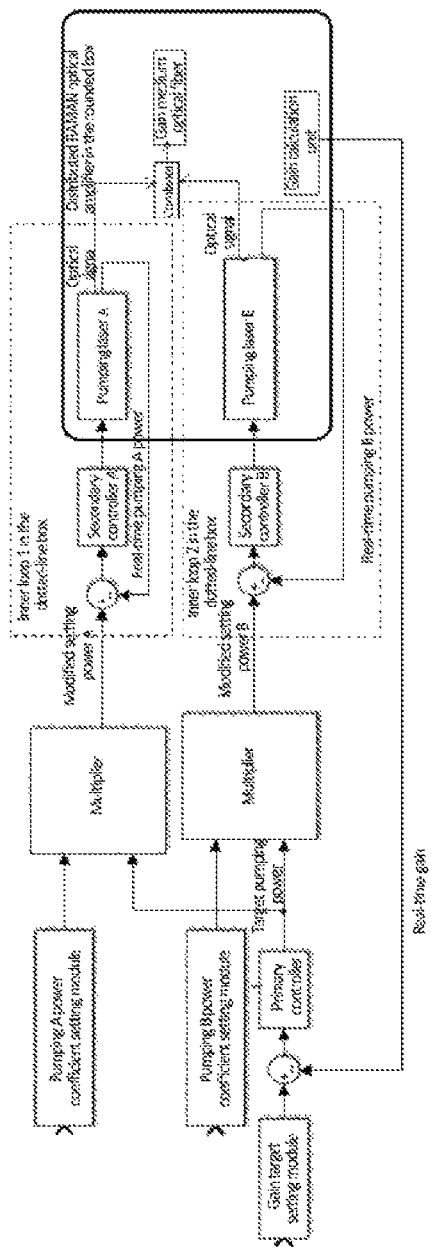
FIG. 3 shows an example of implementation of gain control in a distributed RAMAN amplifier.

FIG. 3 shows a cascade control structure used in a case where power of a plurality of pumping lasers needs to be controlled according to some parameters or control targets. Assume gain is still the control target. The outer feedback control loop takes gain as the target parameter, and the control signal outputted from the primary controller in the outer feedback control loop is the target pumping power value that describes magnitude of the pumping power as the control target of the primary control loop. The target pumping power value is multiplied by a given coefficient for the respective pumping lasers, obtaining a modified power setting value for the respective pumping lasers and thereby setting the pumping power. FIG. 3 shows a structure adopting two pumping lasers. A distributed RAMAN optical amplifier includes a pumping laser A and a pumping laser B, a combiner, a gain medium fiber, and a gain calculation unit. The secondary controller A controls the pumping laser A based on the modified setting power A, and the real-time pumping power of the pumping laser A is fed back to the secondary controller A, forming the inner feedback control loop 1. The secondary controller B controls the pumping laser B based on the modified setting power B, and the real-time pumping power of the pumping laser B is fed back to the secondary controller B, forming the inner feedback control loop 2. The laser outputted from the pumping laser A and the laser outputted from the pumping laser B are combined in the combiner and amplified in the gain medium fiber, and then is outputted. The real-time gain calculation unit calculates the real-time gain of the distributed RAMAN optical amplifier and feeds it back to the primary controller, forming the outer feedback control loop. The primary controller provides the target pumping power values to the pumping laser A and the pumping laser B respectively based on the gain target set by the target gain setting module and the real-time gain feedback set by the target gain setting module. The target pumping power value for the pumping laser A and the target pumping power value for the pumping laser B are modified in the multiplier according to the setting values from the pumping A power coefficient setting module and the pumping B power coefficient setting module, respectively, to obtain the modified setting power A for the secondary controller A and the modified setting power B for the secondary controller B, thereby achieving the cascade control structure of the distributed RAMAN optical amplifier. Those skilled in the art can appreciate that three or more inner feedback control loops may be used in the structure depending on the actual needs, the number of inner feedback control loops depends on the number of pumping lasers, and these inner feedback control loops may be parallel to each other, each of which may have similar functions and be configured as shown within the dotted line box in FIG. 3. Each inner feedback control loop aims to control the pumping current for the corresponding pumping laser so as to control the power of the pumping laser to a given value. Compared with the single-loop controller that realizes the real-time control by using of a lookup table describing relationship between power and current of the pumping laser, the cascade control system of the present invention does not need to concern the change of the pumping power-current curve due to aging of the pumping laser, and therefore the target parameter can be accurately controlled even when the characteristics of the pumping laser have changed. In addition, the cost for the calibration process may be saved, which is an obvious advantage.

The cascade control system of the optical fiber amplifier of the present application adopts two or more cascade control loops so that disturbance entering into the secondary loop can be overcome quickly, thereby the dynamic characteristics of the system may be improved. The primary controller aims to "coarse adjustment" and overall target control, and the secondary controller aims to "fine adjustment" and quick convergence of a short-term target, so that the control quality of the cascade control system may be further improved. Meanwhile, as compared with the parameters mapping method in some single-loop systems, the cascade control system may define the overall control target directly in the primary loop and avoid impact of aging characteristics of some special parameters on the application. As to applications in which the overall control target is associated with two or more parameters, two or more control loops may be used so that the two or more parameters may be decoupled with each other, and fluctuation caused by real-time iterative calculation in single-loop control may be avoided, thereby improving the dynamic indicator of the system. In practice, based on the hardware interface of the existing pumping laser, the pumping current is generally used as the control output of the inner feedback control loop, and the control target of the inner feedback control loop is the control output of the upper-level outer feedback control loop. For the system with more than two levels, it may have the similar configuration to achieve multi-level control.

The invention claimed is:

1. A cascade control system for an optical fiber amplifier, comprising a target setting parameter module, a primary controller, at least one controlled module, and an secondary controller corresponding to the controlled module, wherein
    the target setting parameter module is configured to set a first target parameter signal to the primary controller, the first target parameter being a first output parameter desired for the controlled module to achieve;
    the primary controller is configured to generate a second target parameter signal corresponding to each controlled module based on the first target parameter signal outputted from the target setting parameter module and a first target parameter monitoring signal outputted from the controlled module, the second target parameter being a second output parameter desired for the controlled module to achieve, the second output parameter desired for the controlled module to achieve being different from but associated with the first output parameter desired for the controlled module to achieve;
    the secondary controller is configured to output a control signal to the corresponding controlled module based on the second target parameter signal and a second target parameter monitoring signal outputted from the controlled module;
    the controlled module is configured to operate as being driven by the control signal outputted from the secondary controller and generate the second target parameter monitoring signal that is fed back to the corresponding secondary controller, and the first target parameter monitoring signal that is fed back to the primary controller; and
    the secondary controller and the corresponding controlled module constitute an inner feedback control loop, and the inner feedback control loop and the primary controller constitute an outer feedback control loop.

2. The cascade control system for an optical fiber amplifier of claim 1, wherein the controlled module is a pumping laser and amplifier module, the first target parameter is a real-time gain desired for the pumping laser and amplifier module to achieve, and the second target parameter is a real-time pumping power desired for the pumping laser and amplifier module to achieve.

3. The cascade control system for an optical fiber amplifier of claim 1, wherein the outer feedback control loop further comprises a secondary target parameter modification module and a secondary target parameter setting module corresponding to the secondary controller, the secondary target parameter modification module is configured to modify the second target parameter signal outputted from the primary controller based on a value set by the secondary target parameter setting module.

4. The cascade control system for an optical fiber amplifier of claim 3, wherein the secondary target parameter modification module is an upper-limit power protection module, the secondary target parameter setting module is a limited power setting module, and the upper-limit power protection module is configured to modify the second target parameter signal outputted from the primary controller based on a limit value set by the limited power setting module.

5. The cascade control system for an optical fiber amplifier of claim 3, wherein the secondary target parameter modification module is a multiplier, the secondary target parameter setting module is a power coefficient setting module, and the multiplier is configured to modify the second target parameter signal outputted from the primary controller based on a coefficient set by the power coefficient setting module.

6. The cascade control system for an optical fiber amplifier of claim 1, wherein the outer feedback control loop includes a plurality of inner feedback control loops parallel with each other, and each inner feedback control loop corresponds to a set of secondary target parameter modification module and secondary target parameter setting module.

7. The cascade control system for an optical fiber amplifier of claim 1, wherein the outer feedback control loop includes a plurality of inner feedback control loops cascaded to each other, and each inner feedback control loop corresponds to a set of secondary target parameter modification module and secondary target parameter setting module.

8. The cascade control system for an optical fiber amplifier of claim 1, wherein the primary controller and the secondary controller each may be a feedback controller or a feedforward feedback controller;
    the primary controller and the secondary controller each may be a PID controller or a PI controller;
    the primary controller and the secondary controller may further incorporate fuzzy logic control and adaptive control.

* * * * *